(12) United States Patent
Johnson et al.

(10) Patent No.: US 10,413,854 B2
(45) Date of Patent: Sep. 17, 2019

(54) SUPPORT STRUCTURE FOR PLEATED FILTER MEDIA AND METHODS

(71) Applicant: Donaldson Company, Inc., Minneapolis, MN (US)

(72) Inventors: Philip Edward Johnson, Apple Valley, MN (US); Gregory L. LaVallee, Monticello, MN (US); Janelle M. Hampton, Burnsville, MN (US); Daniel E. Adamek, Bloomington, MN (US); Jonathan G. Parsons, Lino Lakes, MN (US); Richard Osendorf, West St. Paul, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 351 days.

(21) Appl. No.: 14/521,811

(22) Filed: Oct. 23, 2014

(65) Prior Publication Data

US 2015/0151233 A1 Jun. 4, 2015

Related U.S. Application Data

(60) Provisional application No. 61/895,197, filed on Oct. 24, 2013.

(51) Int. Cl.
*B01D 46/00* (2006.01)
*B01D 29/11* (2006.01)
(Continued)

(52) U.S. Cl.
CPC .......... *B01D 46/0005* (2013.01); *B01D 29/11* (2013.01); *B01D 46/0004* (2013.01);
(Continued)

(58) Field of Classification Search
CPC . B01D 46/521; B01D 46/02; B01D 46/04–05
See application file for complete search history.

(56) References Cited

U.S. PATENT DOCUMENTS

| 2,587,693 A | * | 3/1952 | Burks | B01D 27/06 210/457 |
|---|---|---|---|---|
| 3,246,766 A | * | 4/1966 | Pall | B01D 29/21 210/457 |

(Continued)

FOREIGN PATENT DOCUMENTS

| DE | 2625416 | 12/1977 |
|---|---|---|
| EP | 0352188 | 1/1990 |

OTHER PUBLICATIONS

International Search Report and Written Opinion for Application No. PCT/US2014/062019 dated Feb. 12, 2015.
(Continued)

*Primary Examiner* — Amber R Orlando
(74) *Attorney, Agent, or Firm* — Merchant & Gould P.C.

(57) ABSTRACT

A support structure for an interior volume of a construction of pleated media is operably oriented in the interior volume and structurally supports the media. The support structure can pass directly through an innermost 60% of the interior volume. It can have a void volume not more than 80%. It can be inner liner-free and extend in a non-curved path. It can include a first sheet and second sheet of porous material. At least a first brace construction secures the first sheet and second sheet together and in spaced apart, opposing relation. The support structure can include a pleated construction having pleats extending in a direction non-parallel and angled to the direction of pleats of the pleated filter media. The support structure can be molded spacers.

20 Claims, 14 Drawing Sheets

(51) Int. Cl.
  *B01D 46/02* (2006.01)
  *B01D 46/52* (2006.01)

(52) U.S. Cl.
  CPC ........... *B01D 46/02* (2013.01); *B01D 46/521* (2013.01); *B01D 2201/04* (2013.01); *B01D 2201/0415* (2013.01); *B01D 2201/12* (2013.01); *B01D 2201/602* (2013.01); *B01D 2265/06* (2013.01)

(56) References Cited

U.S. PATENT DOCUMENTS

| | | | |
|---|---|---|---|
| 3,252,270 A | 5/1966 | Pall et al. | |
| 3,420,377 A * | 1/1969 | Vandersip | B01D 27/06 |
| | | | 210/315 |
| 3,941,571 A | 3/1976 | Getzin | |
| 4,141,128 A | 2/1979 | Wonderling | |
| 4,231,770 A | 11/1980 | Johnson, Jr. | |
| 4,259,095 A | 3/1981 | Johnson, Jr. | |
| 4,673,503 A | 6/1987 | Fujimoto | |
| 5,230,455 A | 7/1993 | Price | |
| 5,800,580 A | 9/1998 | Feldt | |
| 6,099,729 A * | 8/2000 | Cella | B01D 29/111 |
| | | | 210/315 |
| 6,482,247 B2 | 11/2002 | Jaroszczyk et al. | |
| 6,511,599 B2 | 1/2003 | Jaroszczyk et al. | |
| 6,569,330 B1 * | 5/2003 | Sprenger | B01D 17/045 |
| | | | 210/315 |
| 6,875,342 B2 | 4/2005 | Shane | |
| 7,597,734 B2 | 10/2009 | Johnson et al. | |
| 7,883,291 B2 | 2/2011 | Theisen et al. | |
| 8,282,713 B2 | 10/2012 | Smithies et al. | |
| 8,449,638 B2 | 5/2013 | Gieseke et al. | |
| 8,496,120 B2 | 7/2013 | Willuweit | |
| 2005/0072129 A1 * | 4/2005 | Daleiden | B01D 46/0004 |
| | | | 55/385.1 |
| 2005/0082217 A1 * | 4/2005 | Hagg | B01D 33/23 |
| | | | 210/331 |
| 2006/0174768 A1 | 8/2006 | Taylor et al. | |
| 2007/0045167 A1 * | 3/2007 | Jaroszczyk | B01D 46/0067 |
| | | | 210/337 |
| 2008/0092501 A1 * | 4/2008 | Sporre | B01D 46/2411 |
| | | | 55/493 |
| 2014/0144111 A1 * | 5/2014 | Campbell | B01D 46/2411 |
| | | | 55/482 |
| 2015/0151233 A1 | 6/2015 | Johnson et al. | |

OTHER PUBLICATIONS

International Search Report and Written Opinion for PCT/US2016/028278, dated Jul. 18, 2016.

Co-pending U.S. Appl. No. 15/567,948, filed Oct. 19, 2017.

* cited by examiner

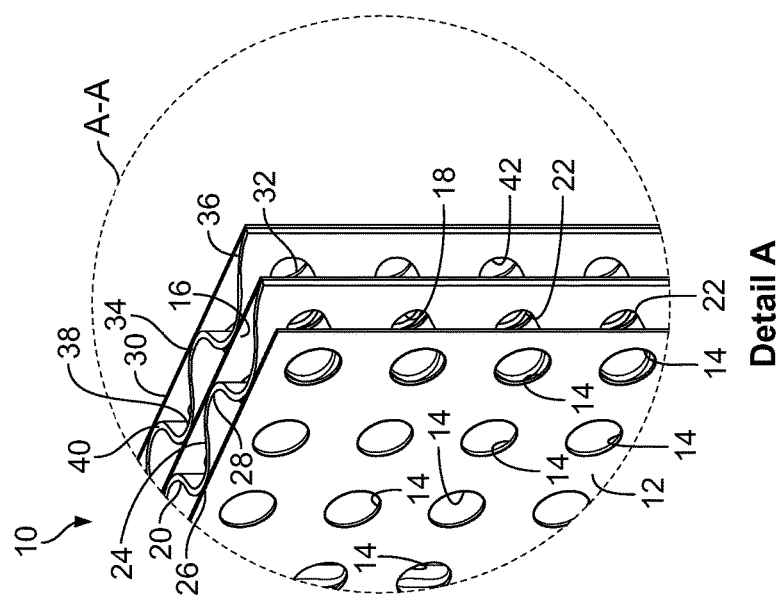
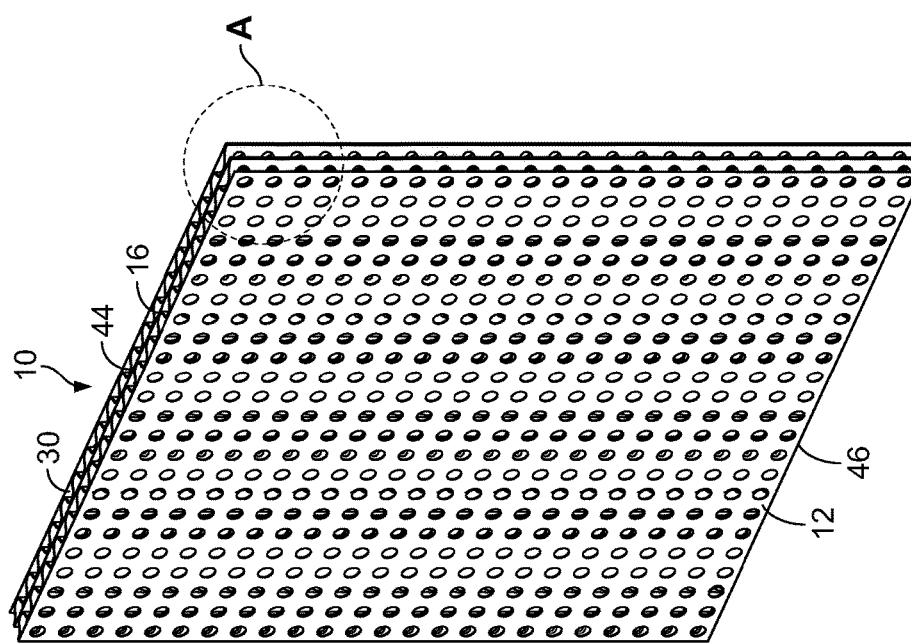

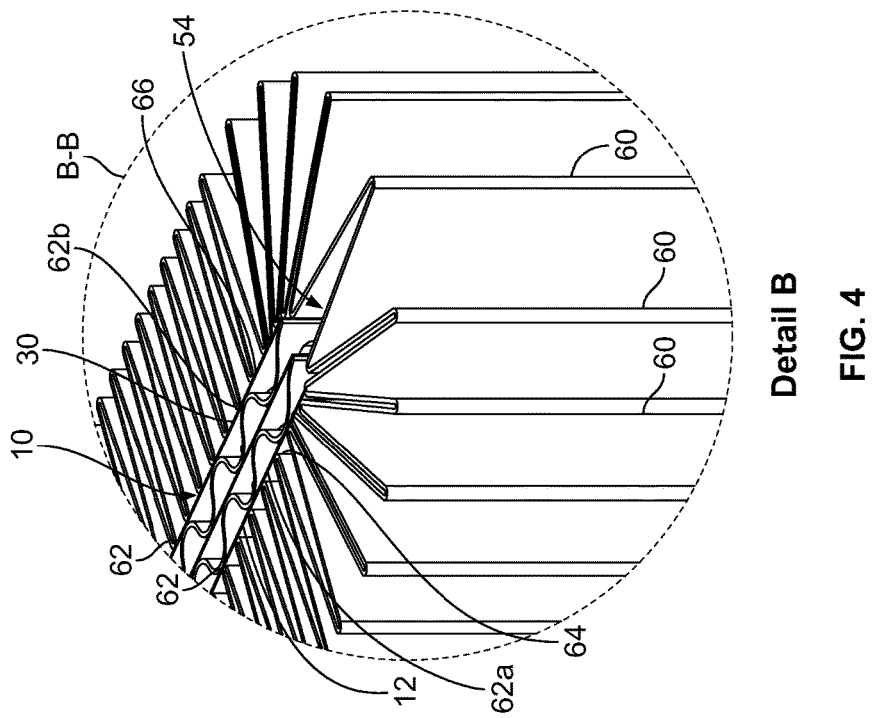
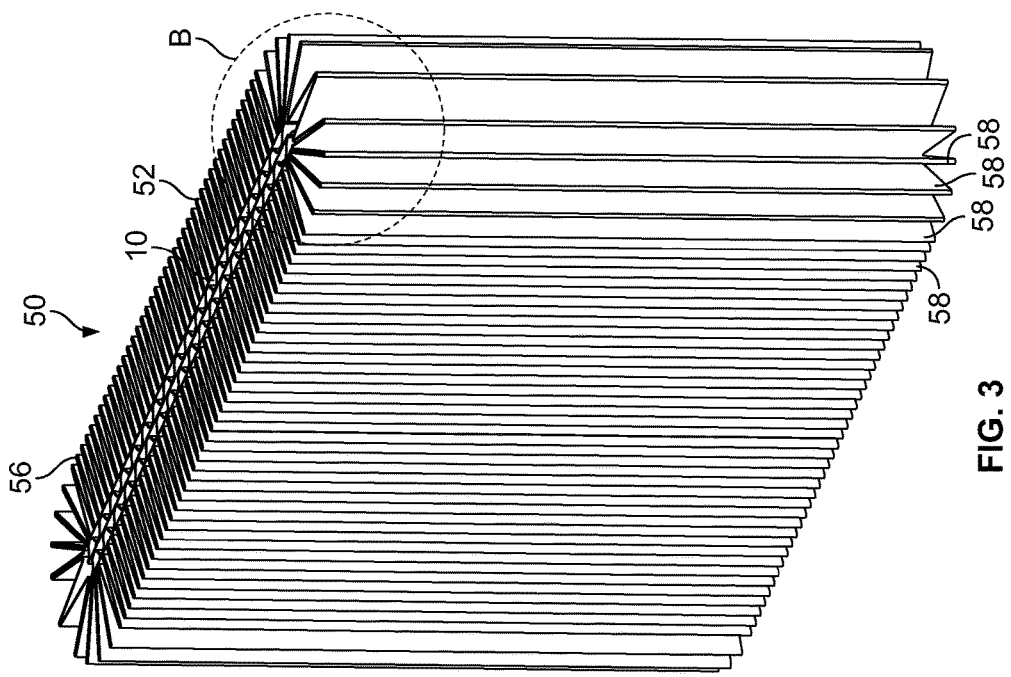
FIG. 4
FIG. 3

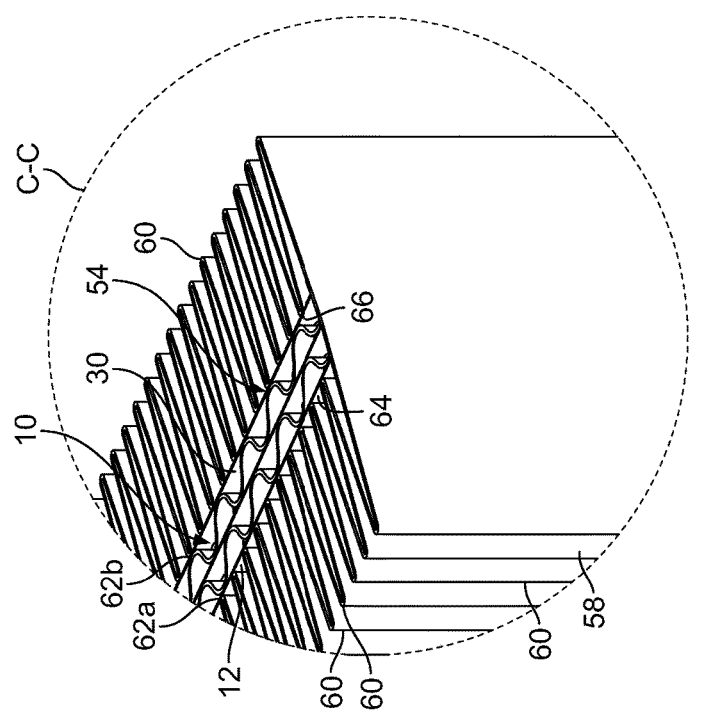
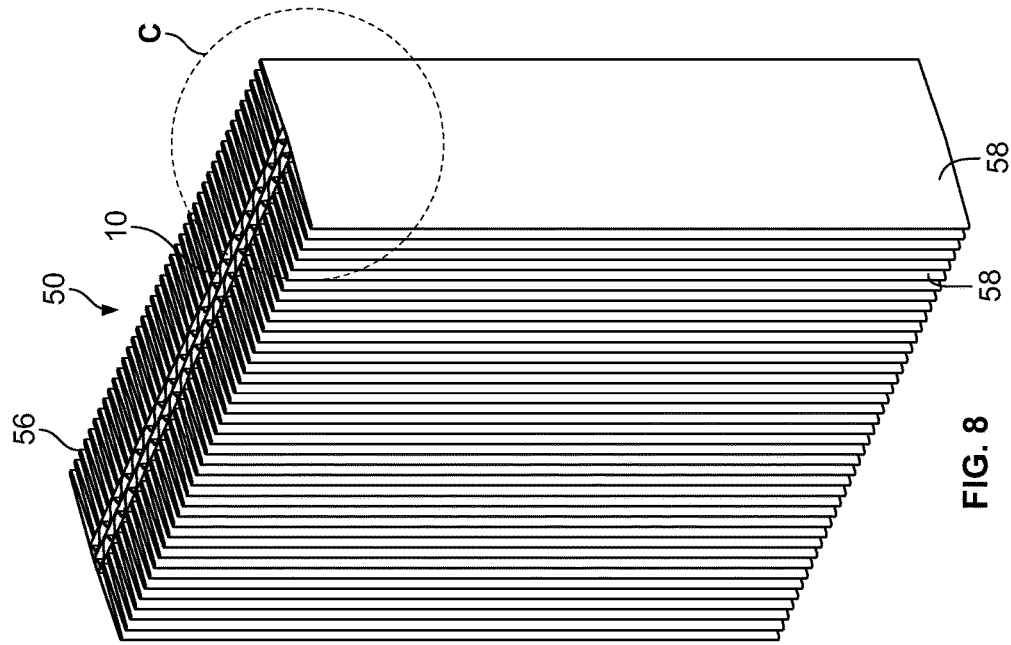

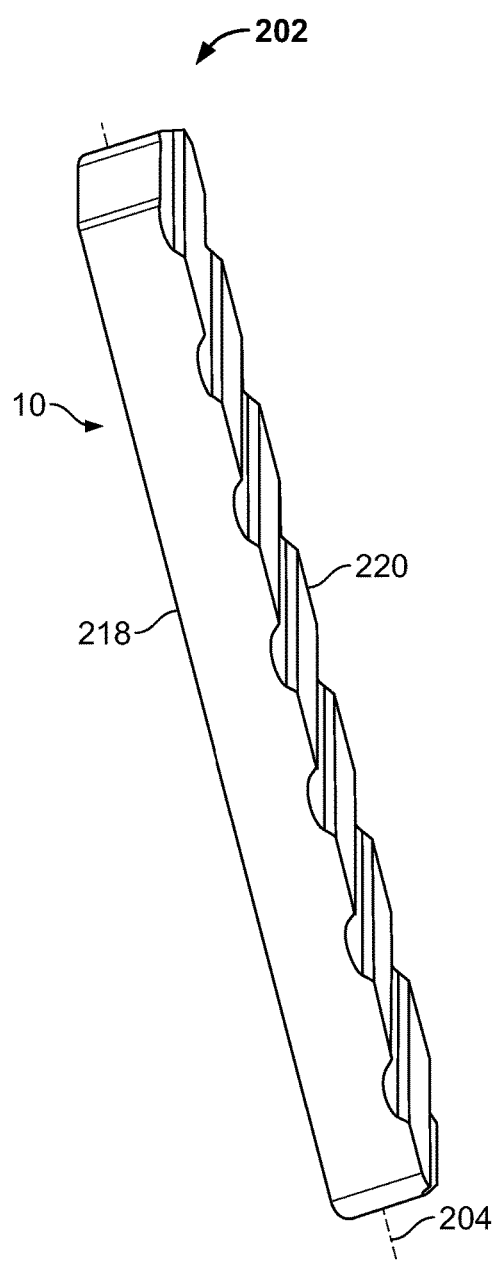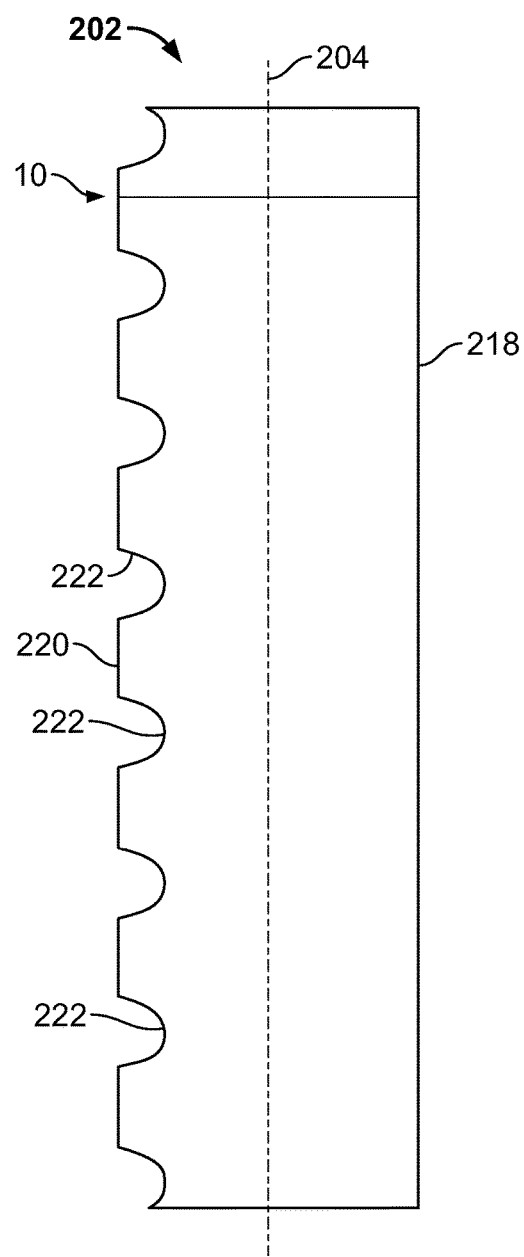
FIG. 17                    FIG. 18

SUPPORT STRUCTURE FOR PLEATED FILTER MEDIA AND METHODS

This application claims priority to provisional application 61/895,197, filed Oct. 24, 2013, incorporated by reference herein.

TECHNICAL FILED

This disclosure concerns a support structure for a tubular construction of pleated media. In particular, this disclosure concerns a porous support structure for a filter element having pleated media, methods of construction, and methods of use.

BACKGROUND

Filter elements of pleated media are often arranged in a tubular construction. By the word "tubular", it is meant a closed loop, which can be round, non-round, oval, elliptical, etc. The filter elements can be used in a variety of applications such as cleaning the air intake for compressors, or filtering the air in dust collectors, just to name a couple of examples. In many cases, the fluid to be filtered flows from the exterior, through the pleats, and into the open interior volume of the tubular construction. In many situations, it is desirable to support the pleated media from within the interior volume of the filter element in order to prevent the pleats from collapsing against themselves in the interior volume. When the tubular construction is oval or elliptical, the problem with having the pleats collapse against themselves is even more of an issue because of the geometry of the cross-sectional shape of the media construction.

One typical approach to supporting filter media within the interior of the filter includes using an inner filter liner. The inner filter liner is often made from metal and is porous or porous to allow fluid flow therethrough. There have been uses of non-metal as inner liners, as well.

In some environments which these filters operate, the environment is noisy due to operation of machinery, such as a generator, blower, or engine. Some filter constructions generate excessive noise due to air velocity, filter configuration, etc.

Improvements in media support and/or in ways to reduce noise are desirable.

SUMMARY

In accordance with principles of this disclosure, a filter element is provided. The filter element includes a construction of pleated filter media defining an interior volume. The first and second opposite end caps are secured to opposite ends of the filter media. A support structure supports the filter media and is operably oriented in the interior volume.

The support structure can bridge or extend between opposing faces of the pleated filter media and pass directly through an innermost 60% of the interior volume.

The support structure can have a void volume of no more than 80%.

The support structure can be inner-liner free.

The support structure can extend in a non-curved path between opposing faces of the pleated media.

The support structure can include a pleated construction having pleats extending in a direction non-parallel and angled relative to a direction of pleats of the pleated filter media in which it is operably oriented within the interior volume 54.

In one or more example embodiments, the pleated construction extends at an angle 80-100 degrees relative to the direction of pleats of the pleated filter media.

In one or more example embodiments, the pleats of the pleated construction extend about perpendicular relative to the direction of pleats of the pleated filter media.

In example embodiments, the pleated construction can comprise a semi-rigid pleated screen.

The support structure can include at least a first wall of porous material oriented against the filter media in the interior volume. The support structure can include at least a second wall of porous material, spaced from and opposing the first wall, and oriented against the filter media in the interior volume. The first wall and second wall can be secured together in spaced apart, opposing relation.

The forces are equal and opposite on the first and second walls of the spacer.

In some aspects, the support structure can extend a complete length between the first and second end caps. Alternatively, the support structure can extend less than a complete length between the first and second end caps.

In some aspects, the support structure further includes at least a third wall of porous material. The third wall is between, and spaced from, the first wall and second wall and is secured to the first wall and second wall.

In some aspects, the first wall is secured to the third wall with a corrugated material, and the third wall is secured to the second wall with a corrugated material.

The support structure may comprise a plurality of molded spacers.

In one or more embodiments, the molded spacers can be spaced from each other.

In one or more embodiments, the molded spacers can be angled at a non-zero and non-perpendicular angle relative to the direction of pleats of the pleated media.

In some embodiments, the molded spacers can be angled at an angle 30-150 degrees relative to the direction of pleats of the pleated filter media.

In some examples, the molded spacers can be angled at an angle 100-140 degrees relative to the direction of pleats of the pleated media.

The spacers may comprise molded polyurethane.

In one or more embodiments, there are at least two spacers having a different length.

In one or more embodiments, each spacer has a first wall secured to an interior face of the pleated media, and a second wall opposite the first wall secured to an opposite interior face of the pleated media.

In one or more example embodiments, the second wall of the spacer includes at least one scallop shape.

In some example aspects, the support structure is secured to at least the second end cap.

In example aspects, the pleated filter media is non-round and could be rectangular, oval, or elliptical.

In example aspects, the support structure has a rectangular cross-section perimeter shape.

In accordance with principles of this disclosure, a method of filtering is provided. The method includes providing a filter element having a tubular construction of pleated filter media defining an open interior volume and first and second opposite end caps secured to opposite ends of the filter media. The method includes directing fluid to flow through the pleated media and into the interior volume. While the fluid is flowing through the pleated filter media, the method includes supporting the filter media to prevent the filter media from collapsing together by using a support structure oriented in the interior volume.

In accordance with principles of this disclosure, a support structure for an interior volume of a tubular construction of pleated media is provided. The support structure includes at least a first sheet and second sheet of material. Each of the first sheet and second sheet is porous to allow fluid flow therethrough. At least a first brace construction of material secures the first sheet and second sheet together and in spaced apart, opposing relation. The first brace construction is porous to allow fluid flow therethrough.

In some aspects, the first brace construction comprises a first corrugated sheet.

In some aspects, there is also a third sheet of material that is porous to allow fluid flow therethough. At least a second brace construction of material secures the third sheet to the second sheet in spaced, opposing relation and on an opposite side of the second sheet as the first sheet. The second brace construction is porous to allow fluid to flow therethrough.

In example aspects, the support structure comprises cellulose.

It is noted that not all the specific features described herein need to be incorporated in an arrangement for the arrangement to have some selected advantage according to the present disclosure.

BRIEF DESCRIPTION OF THE DRAWINGS

FIG. 1 is a perspective view of one embodiment of a support structure, constructed in accordance with principles of this disclosure;

FIG. 2 is an enlarged view of section A-A of FIG. 1;

FIG. 3 is a perspective view of the support structure of FIG. 1 operably assembled within a tubular construction of pleated media, constructed in accordance with principles of this disclosure;

FIG. 4 is an enlarged view of section B-B of FIG. 3;

FIG. 8 is a perspective view of the support structure of FIG. 1 operably assembled within a tubular construction of pleated media, constructed in accordance with principles of this disclosure;

FIG. 9 is an enlarged view of section C-C of FIG. 8;

FIG. 17 is a schematic, perspective view of an embodiment of a spacer used as a support structure in the embodiment of FIGS. 13-16;

FIG. 18 is a side view of the spacer of FIG. 17; and

DETAILED DESCRIPTION

Figure 5:
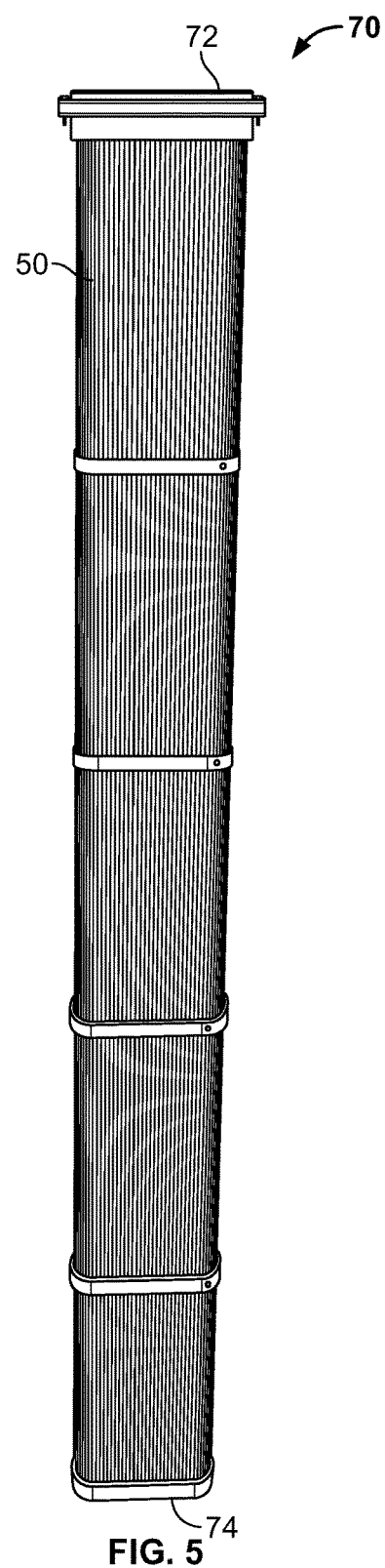
FIG. 5 is a front view of one example filter element having a support structure constructed in accordance with principles of this disclosure.

One of the problems with pleated filter elements, and in particular, tubular pleated elements, is that they are more easily crushed by pressure created during operation of the filter. By placing a porous core in the open filter interior, rigidity is added to the filter element. This will make the element more reliable, than in constructions without such support. When the support structure is made of a cellulose material, the element is more environmentally friendly. This also contributes to making the filter element lighter and more easily serviced, than in constructions that have a metal inner liner. In addition, in environments that are noisy, the support structure can be constructed to dampen sound. Further advantages can be achieved when the element is made rectangular in shape, in which three dimensional space is limited. Oval shaped elements can also have advantages in fitting in limited space. Further, by making the filter element without the use of any metal of steel, cost to manufacture the element will be reduced.

First, attention is directed to FIGS. 3, 4, 8, and 9, which illustrate one example support structure 10 operably oriented in an interior volume of a construction of pleated media 50. The pleated media 50 can be tubular shape 52, defining an interior volume 54 (FIGS. 4 and 9). In these examples, the support structure 10 is within the interior volume 54. The tubular shape 52 can be any shape forming a closed loop, such as round, non-round, oval, rectangular, or elliptical, for example. In the example shown in FIG. 3, the tubular shape 52 includes an oval shape 56. In the example shown in FIG. 8, the tubular shape 52 is rectangular.

The pleated media 50 has a plurality of pleats 58. The pleats 58, in the embodiment shown, have outer pleat tips 60 and inner pleat tips 62. The outer pleat tips 60 are along the exterior of the pleated media 50. The inner pleat tips 62 are along the interior volume 54. The pleated media 50, when in the tubular shape, has first and second opposing faces 64, 66 (FIGS. 4 and 9), which generally correspond to the inner pleat tips 62.

Figure 6:
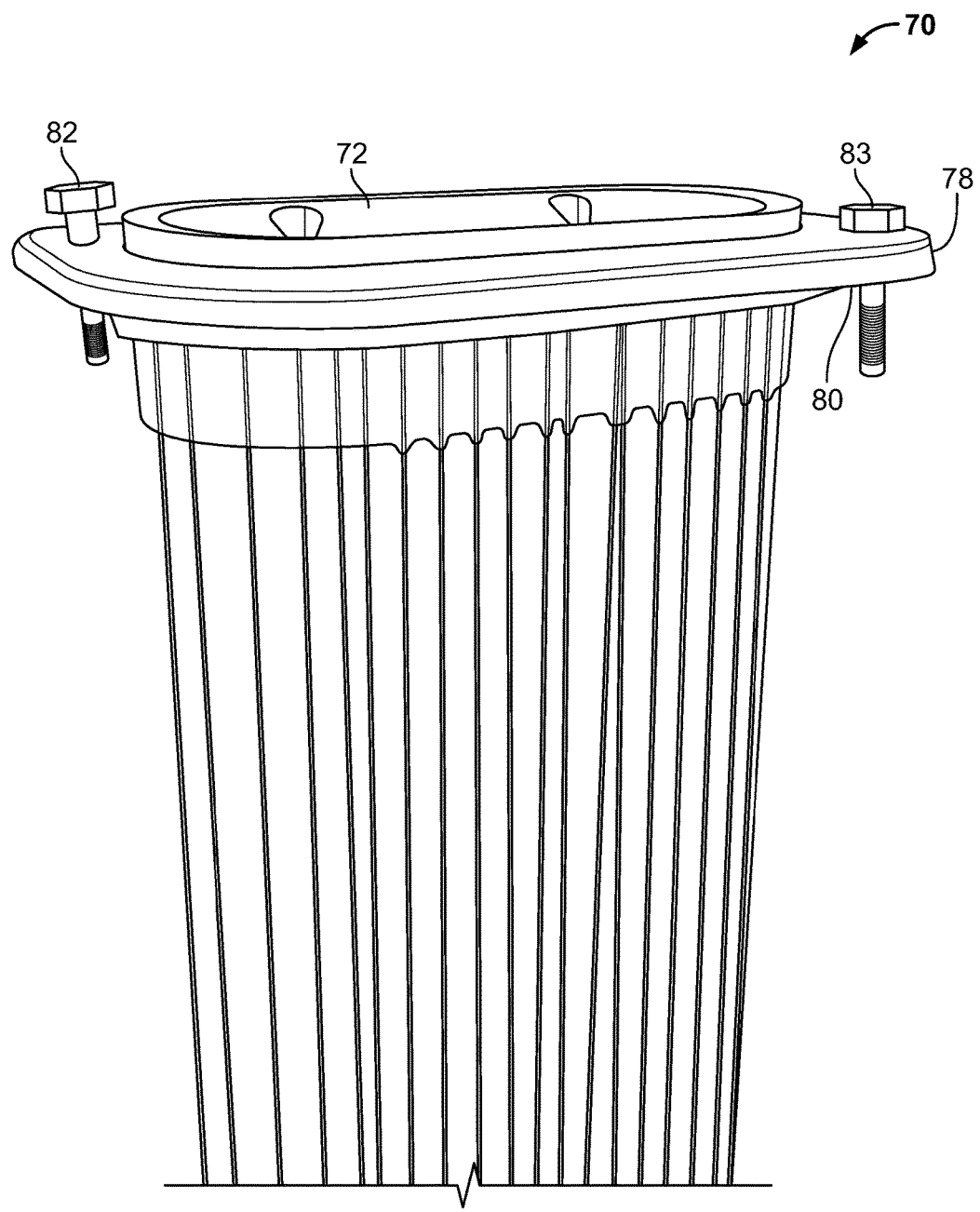
FIG. 6 is an enlarged view of an upper portion of the filter element of FIG. 5.
Figure 7:
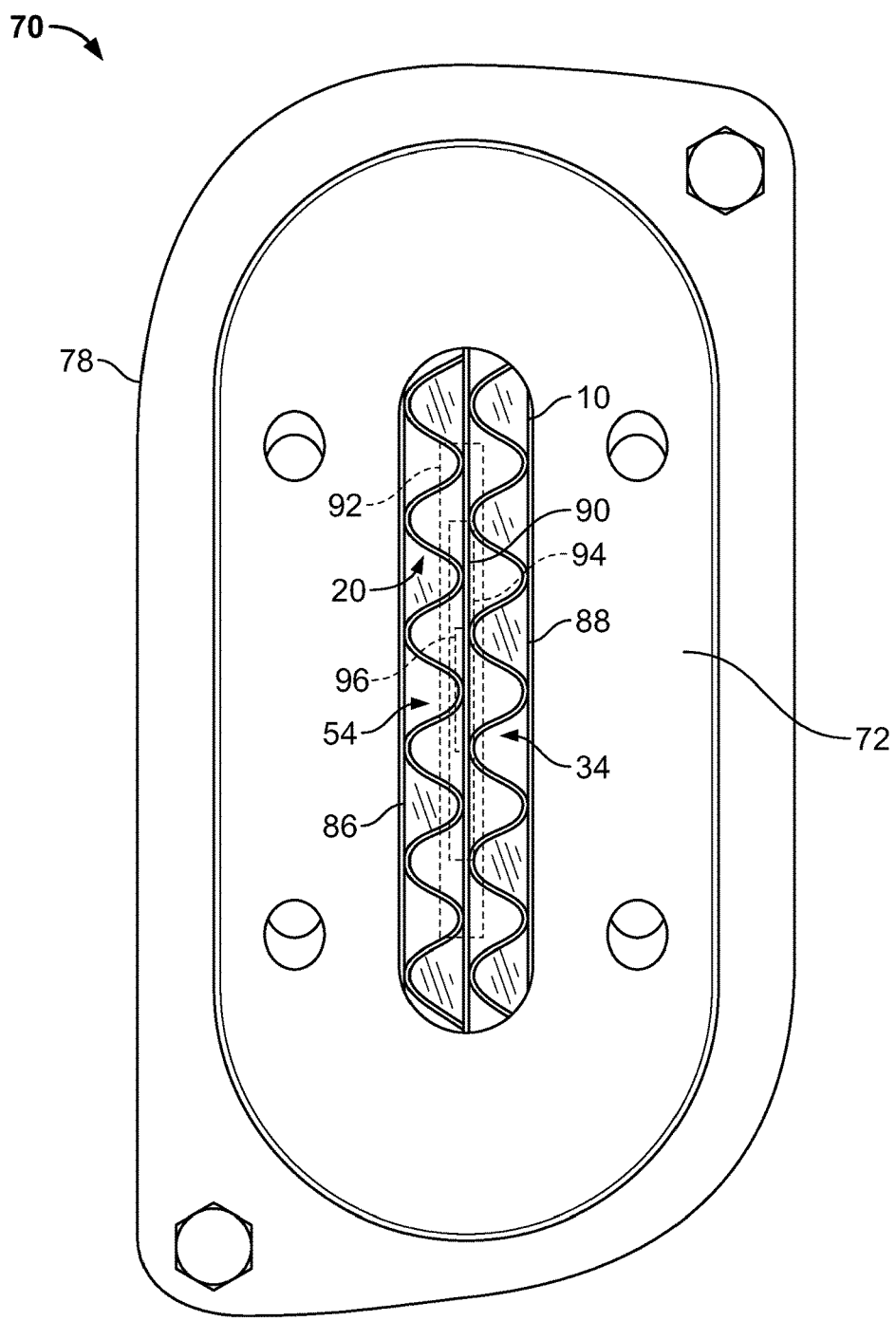
FIG. 7 is a top view of the filter element of FIGS. 5 and 6, in which the support structure can be seen operably oriented within the open filter interior.

The pleated media 50 can be part of a filter element 70 (FIGS. 5-7). Many different types of elements 70 are possible. In the element 70 illustrated in FIG. 5, the element 70 includes the tubular construction of pleated media 50. The tubular construction defines interior volume 54 (FIG. 7). More details on the example filter element 70 are discussed below.

The support structure 10 supports the pleated filter media 50. By "supports", it is generally meant a structural mechanism to resist opposing forces. The support structure 10 prevents pleat collapse and crushing of the element together through the interior. By "pleat collapse," it is meant that the support structure 10 prevents individual pleats from collapsing inwardly towards the center (interior volume 54) of the element 70 and the element 70 crushing together through the interior.

The support structure 10 is operably oriented in the interior volume 54 of the pleated media 50. In many examples, the support structure 10 bridges between the first opposing interior face 64 to the second opposing interior face 66. For example, the support structure 10 extends from the first opposing interior face 64 to the second opposing interior face 66 to structurally support the pleated media 50.

In providing support to the pleated media 50, the support structure 10 passes directly through an innermost 60% region 92 (dashed line box in FIG. 7) of the interior volume 54. That is, when viewing the tubular pleated media 50 in plan (top view, such as FIG. 7), such that the interior volume is shown in the center of the tubular pleated media, the innermost 60% region 92 includes the area proximate the center of the interior volume 54 and the area emanating from the center in the direction toward the opposing interior faces 64, 66.

In many implementations, the support structure 10 passes directly through an innermost 40% region 94 (dashed line box inside of box 92) in FIG. 7 of the interior volume 54, and frequently through an innermost 20% region 96 (dashed line box inside of box 94) of the interior volume 54. In the example shown in FIG. 7, the support structure 10 passes directly through the innermost 60% region 92, and the innermost 40% region 94, and through the innermost 20% region 96. It should be understood that in some examples, a support structure can pass through the innermost 60% region 92 and not pass through either of both of the regions 94, 96.

The support structure 10 is sturdy enough to structurally support the pleated media 50, yet light enough to not add excessive weight to the element 70. The support structure 10, further, does not contribute significantly to restriction (pressure drop) across the element 70. To achieve these advantages, it has been found that the support structure 10 will typically have a void volume not greater than 80%. "Void volume" is the amount of open space, or space not occupied by material. In many cases, advantages are achieved if the void volume is not greater than 60%.

The support structure 10 functions to structurally support the pleated media 50 while being operably oriented in the interior volume 54, and the support structure 10 is not an inner liner for the pleated media 50. Thus, the support structure 10 structurally supports the pleated media 50 in the absence of an inner liner. As such, the support structure 10 is inner liner-free. In some implementations, the filter element 70 is inner liner-free.

In one or more embodiments, the filter element 70 may include an additional porous structure in the interior volume 54, lining the media interior. The porous structure lining the media interior will typically not be sufficiently strong to function as a support to the pleated media 50. The porous structure can be flimsy material, such as netting, etc.

The support structure 10, in some implementations, extends in a non-curved path from the first opposing interior face 64 to the second opposing interior face 66 to structurally support the pleated media 50.

The filter element 70 includes means for supporting the pleated filter media 50. The means for supporting includes the support structure 10, which is between and against opposing faces 64, 66 of the pleated filter media 50.

FIGS. 1 and 2 illustrate a first example embodiment of a support structure 10. The support structure 10 can be used in an interior volume of a tubular construction of pleated media. As mentioned previously, by the term "tubular", it is meant any shape that forms a closed loop, which can be round, non-round, oval, elliptical, etc.

The support structure 10 includes at least a first member or sheet 12 of a material. In some examples, the material can be non-metal. The first sheet 12 is porous with a plurality of openings or holes 14 to allow fluid flow therethrough. In the example shown, although the porous holes 14 are illustrated as circular, it should be understood that any shape of hole can be used, provided that the fluid to be filtered can be passed through it without introducing excess restriction.

The support structure 10 includes at least a second member or sheet 16 of material. In some examples, the material can be non-metal. The second sheet 16 is porous in that it includes a plurality of openings or holes 18. Again, the openings 18 are shown to be circular, but can be any shape.

The first sheet 12 and second sheet 16 may be generally flat and planar, and absent of folds. In the example illustrated in FIG. 1, the first sheet 12 and second sheet 16 are generally rectangular in shape. Other shapes can be used.

The first sheet 12 and second sheet 16 are secured together and spaced apart in opposing relation (e.g., facing each other). The first sheet 12 and second sheet 16 can be secured together by using a first brace construction 20 (FIG. 2).

The first brace construction 20 is a material that will operably hold the first sheet 12 and second sheet 16 in a spaced-apart relation, but secure them together. In many examples, the first brace construction 20 is made from a non-metal material. The first brace construction 20 is porous by including a plurality of openings or holes 22.

As mentioned above, the first brace construction 20 can be any type of structure that will secure the first sheet 12 and second sheet 16 together, but hold them in a spaced apart relationship, and allow for the flow of fluid therethrough. In the particular example illustrated in FIGS. 1 and 2, the first brace construction 20 is a flute or first corrugated member or sheet 24.

The corrugated sheet 24 includes a member having a plurality of alternating ridges 26 and troughs 28. The exterior surface of the ridges 26 and troughs 28 are used for attaching or securing the sheets 12, 16 together. The sheets 12, 16 can be secured together using a variety of techniques such as glue or adhesive.

The support structure 10 can further include at least a third member or sheet 30. The third sheet 30, in many examples, can be of a non-metal material. The third sheet 30 will be porous with a plurality of openings or holes 32 to allow for fluid flow therethrough.

In the embodiment shown, the third sheet 30 is spaced apart from and opposing the second sheet 16. In this way, the second sheet 16 is located between the first sheet 12 and third sheet 30.

The third sheet 30 is secured to the second sheet 16. A second brace construction 34 can be used to secure the third sheet 30 and second sheet 16 together and in spaced apart, opposing relation.

A variety of implementations for the second brace construction 34 are possible. In the embodiment illustrated, the second brace construction 34 is a flute or second corrugated member or sheet 36.

As with the first corrugated sheet 24, the second corrugated sheet 36 includes a member having a plurality of alternating ridges 38 and troughs 40. Along the exterior of each ridge 38 and trough 40, the respective second sheet 16 and third sheet 30 can be attached to the corrugated construction 36. This attachment can be made by glue or adhesive or other techniques.

The second corrugated structure 36 includes a plurality of openings or holes 42 to allow fluid flow therethrough.

As can be seen in FIG. 2, third sheet 30 is on an opposite side of the second sheet 16 as the first sheet 12. When the support structure 10 is constructed as shown in FIGS. 1 and 2, the holes 14, 18, 32, and 42 will allow the passage of fluid, such as air or liquid, therethrough. These holes can be any shape.

In preferred constructions, the first sheet 12, second sheet 16, third sheet 30, first brace construction 20, and second brace construction 34 are non-metal. The non-metal material can include cellulose. Other non-metal materials can be used. For example, the core construction 10 can be made of plastic.

While the example embodiment shows the support structure 10 as having first sheet 12, second sheet 16, third sheet 30, first brace construction 20, and second brace construction 34, other embodiments can include further more sheets and more brace constructions.

In FIG. 1, it can be seen that the overall shape of the support structure 10 that is illustrated is rectangular in perimeter. Of course, other shapes can be used.

In the example shown in FIG. 1, each of the first sheet 12, second sheet 16, third sheet 30, first corrugated sheet 24 and second corrugated sheet 36 have a same length and a same width. There can be variations. The thickness, in this example, would be the distance between the first sheet 12 and third sheet 30.

The support structure 10 can be useful in any sized filter element longer than about 2 inches, and particular, benefits can be achieved in elements that are long, such as elements having a length of at least 50 inches, including elements having a length of at least 80 inches, and in some instances, elements being at least 90 inches long. In most embodiments, the length between the first end 44 and second end 46 will typically match the length of the element, in order to support the pleats, and be at least 50 inches long, or at least 80 inches long, or at least 90 inches long. In most embodiments, the support structure extends along the length of the filter element at least 50%, at least 75%, at least 85%, or at least 95%.

In an alternate embodiment, the filter element includes multiple shorter support structures, that may be connected, or may be spaced apart. The multiple shorter elements added together extend along the length of the filter element at least 50%, at least 75%, at least 85%, or at least 95%.

In the embodiment of FIGS. 4 and 9, the inner pleat tips 62 are in touching engagement against the support structure 10. For example, in FIG. 4, it can be seen how inner pleat tip 62*a* touches the first sheet 12, while inner pleat tip 62*b* touches the third sheet 30.

In some optional embodiments, the inner pleat tips 62 can be adhered to the first sheet 12 and third sheet 30.

The filter element 70 includes a first end cap 72.

At an opposite end of the element 70, there is a second end cap 74.

The first end cap 72 and second end cap 74 are secured to opposite ends of the filter media 50.

In the example arrangement shown, the first end cap 72 is an open end cap in communication with the interior volume 54.

In the example shown, the second end cap 74 can be either a closed end cap or an open end cap.

Many different arrangements are possible. In many implementations, the pleated media 50 will be secured to the first and second end caps 72, 74 by, for example, molding the ends of the pleated media 50 within the end caps 72, 74. In such examples, the first end cap 72 and second end cap 74 are made from a non-metal, molded material. In some examples, the first and second end cap 72, 74, can be made of other types of material, and have the media 50 secured through the use of potting material, for example.

The filter element 70 will typically have a seal structure or gasket to provide an air tight seal between the element 70 and whatever structure the element 70 is installed. Many different embodiments are possible.

In the example shown in FIGS. 6 and 7, the element 70 is sealed within a collar 78. The element 70 is removable from the collar 78, and a seal is formed between the collar 78 and the end cap 72 through conventional ways. The collar 78 can have a gasket 80 (FIG. 6) attached thereto. Fasteners 82, 83, can be seen passing through the collar 78. In this way, the filter element 70 can be secured to, for example, a tubesheet, with the fasteners 82, 83 tightened against the tube sheet to squeeze the gasket 80 between the collar 78 and tubesheet to form a seal therebetween. It should be understood that this is just one example, and there are many different examples of possible sealing arrangements that can be used for the element 70.

In FIG. 7, it can be seen how the support structure 10 is operably oriented in the open interior volume 54. In this example, the first sheet 12 forms a first wall 86 of porous material. The first wall 86 is oriented against the filter media 50 in the interior volume 54. For example, the first wall 86 will be against the inner pleat tips 62 (FIG. 4). The third sheet 30 forms a second wall 88 of porous material. The second wall 88 is spaced from and opposing the first wall 86. In examples that only have first and second walls 86, 88, there will not be any further porous walls in between. The first wall 86 and second wall 88 are secured together in opposing relation. The forces are equal and opposite on the first and second walls 86, 88.

In this example, the support structure 10 includes third wall 90. Third wall 90 is formed by the second sheet 16. The third wall 90 is between, and spaced from, the first wall 86 and second wall 88. The third wall 90 is secured to the first wall 86 and second wall 88.

In the example shown, the first wall 86 is secured to and spaced from the third wall 90 by the first brace construction 20.

In the example shown, the third wall 90 is secured to and spaced from the second wall 88 by the second brace construction 34.

The support structure 10 will preferably extend the length of the element 70 between the first end cap 72 and second end cap 74.

The support structure 10, in some embodiments, can be removably oriented within the interior volume 54. In preferred arrangements, the support structure 10 will be secured, and non-removably oriented within the interior volume 54. In one example, the support structure 10 will be secured to the second end cap 74. For example, the second end 46 (FIG. 1) of the support structure 10 can be embedded, or molded, within the material forming the second end cap 74.

Other ways of permanently securing the support structure 10 to the second end cap 74 can be used. For example, the inner pleats tips 62*a*, 62*b* could be adhered to support structure 10, which will also prevent pleat tip bunching.

The first end 44 of the support structure 10 can be either freely mounted in the filter element 70, or it may be secured around the edges to the first end cap 72. For example, the support structure 10 can be molded or otherwise permanently secured to the first end cap 72.

The filter element 70, in the embodiment shown, has its perimeter shape filled with the support structure 10. This will help to support the pleats 58 from collapsing against each other in the interior volume 54. As should be appreciated from the above, in preferred embodiments, the filter element 70 is free of an inner liner. It can also be free of an outer liner. In many implementations, the filter element 70 is metal free.

In some applications, the filter element 70 has a length between the first end cap 72 and second end cap 74 of at least 2 inches, frequently at least 50 inches, and in some instances, at least 80 inches, and in still other instances, at least 90 inches. In filter element 70, having an oval shape and a length of over 50 inches, the support structure 10 can have advantages, in that it is able to hold the pleats 58 apart along the entire length between the opposite end caps 70, 74. The support structure 10 is able to keep the pleats 58 from collapsing together, without adding the heaviness or weight of metal. In preferred embodiments where the support structure 10 is made of cellulose, the support structure 10 is environmentally friendly and recyclable.

Figure 10:
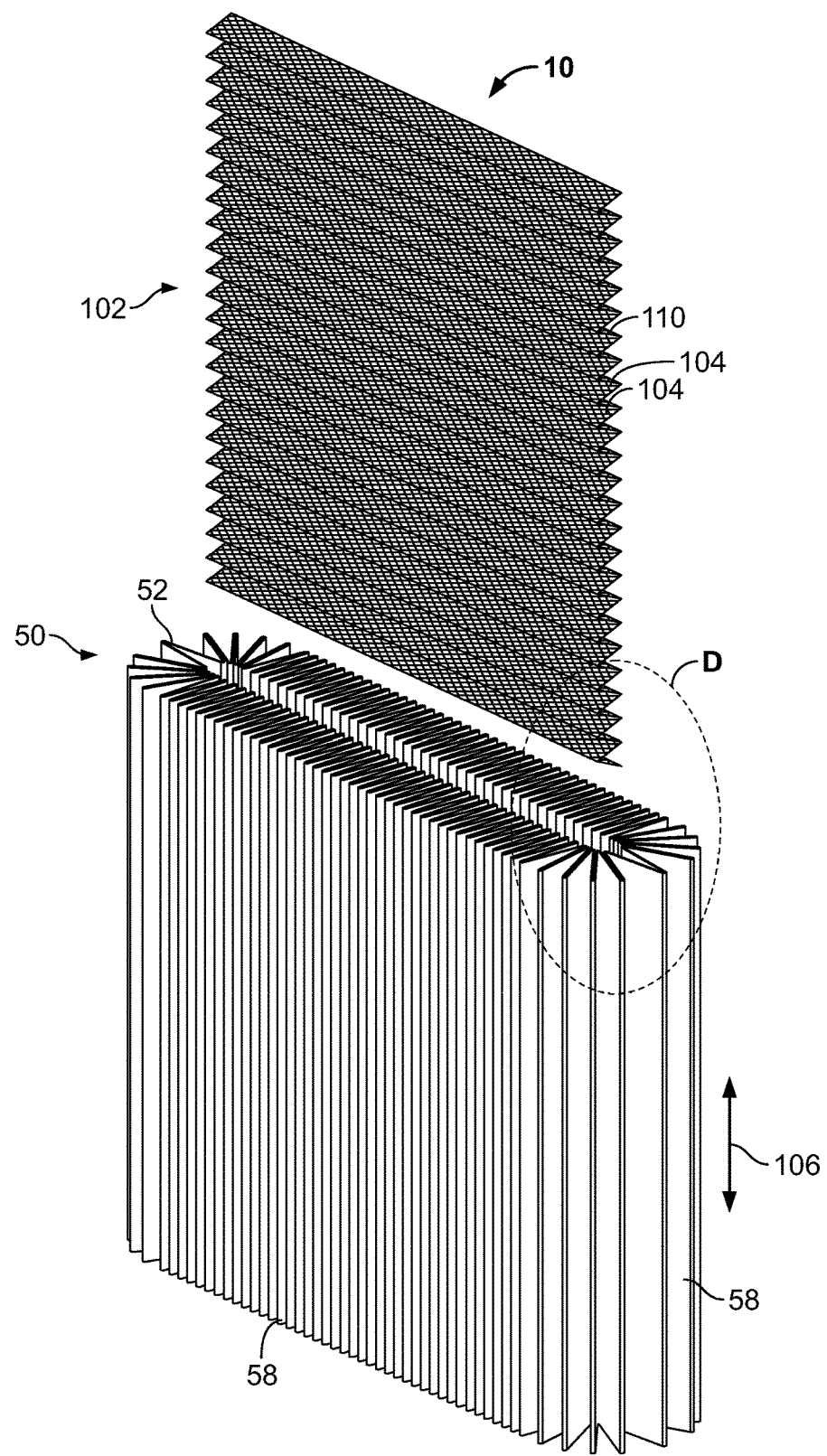
FIG. 10 is an exploded perspective view of another embodiment of a support structure for a tubular construction of pleated media, constructed in accordance with principles of this disclosure.
Figure 11:
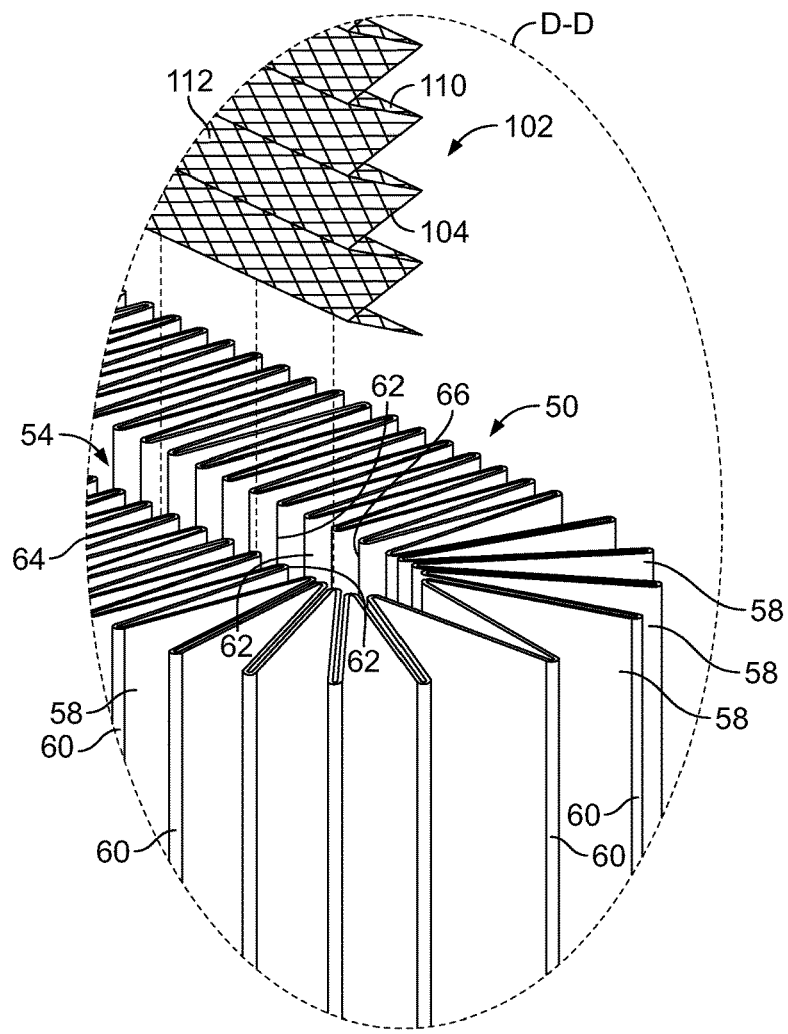
FIG. 11 is an enlarged view of section D-D of FIG. 10.
Figure 12:
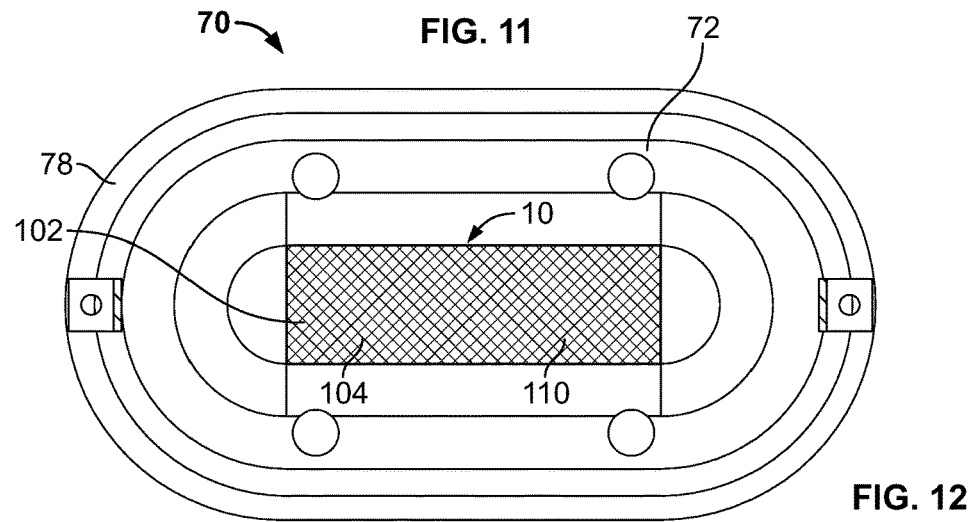
FIG. 12 is a view analogous to FIG. 7, but the filter element having the support structure of FIG. 10.

FIGS. 10-12 illustrate another embodiment of support structure 10. In FIG. 10, support structure 10 comprises a pleated construction 102. The pleated construction 102 has at least a partial section with a plurality of pleats 104.

The plurality of pleats 104 in the pleated construction 102 can be extending in a direction that is non-parallel relative to a direction of pleats 58 in the pleated filter media 50. Preferably, the pleats 104 extend in a direction non-parallel and angled relative to the direction of pleats 58 of the pleated filter media 50.

FIG. 10 shows an arrow at 106 which is parallel to the direction of pleats 58 of the pleated filter media 50. The direction of pleats 104 is preferably angled at a non-zero angle relative to the direction 106 of the pleats of the pleated filter media 50. In one or more embodiments, the angle can be at least 20 degrees; or at least 30 degrees; or at least 45 degrees; or at least 70 degrees. In one or more embodiments, the direction of pleats 104 can be at an angle 80-100 degrees relative to the direction 106 of the pleats of the pleated filter media 50. In the example shown in FIG. 10, the pleated construction 102 has pleats 104 extending in a direction about perpendicular relative to the direction 106 of the pleats 58 of the pleated filter media 50. In one or more embodiments, the angle can be 20-30 degrees; or 30-40 degrees; or 45-70 degrees; or 70-80 degrees. In one or more embodiments, the angle can be 20-100 degrees.

In FIG. 10, the pleats 104 extend from the first opposing interior face 64 to the second opposing interior face 66 of the interior volume 54 of the pleated filter media 50. At least because the direction of pleats 104 is angled relative to the direction of pleats 58, this provides support to the pleated filter media 50.

The pleated construction 102 can be made from many types of materials. In preferred constructions, the pleated construction 102 comprises a semi-rigid pleated screen 110. The pleated screen 110 can be made from plastic or a reinforced cellulose. The pleated screen 110 has an open screen or mesh 112 to allow for fluid flow there through. Preferably, the pleated construction 110 has a void volume of no more than 60%.

FIG. 12 illustrates a top view of the filter element 70 with the support structure 10 in the form of pleated construction 102 operably assembled therein.

The support structure 10, when operably oriented in the interior volume 54, can act as a sound absorption mechanism. In noisy environments, such as environments using compressors, this sound absorption can be helpful in reducing the level of loudness and noise produced by the filter element during operation. The support structure 10 may also perform very coarse filtration.

FIGS. 13-18 illustrate another embodiment of support structure 10. In FIGS. 13-18, the support structure 10 comprises at least one molded spacer 202. In preferred implementations, there are a plurality of molded spacers 202.

The molded spacers 202 have a longitudinal axis 204 (FIG. 18) extending a length of the spacer 202 along its greatest dimension. The longitudinal axis 204 preferably extends in a direction that is non-parallel to a direction of pleats 58 in the pleated media 50.

Figure 13:
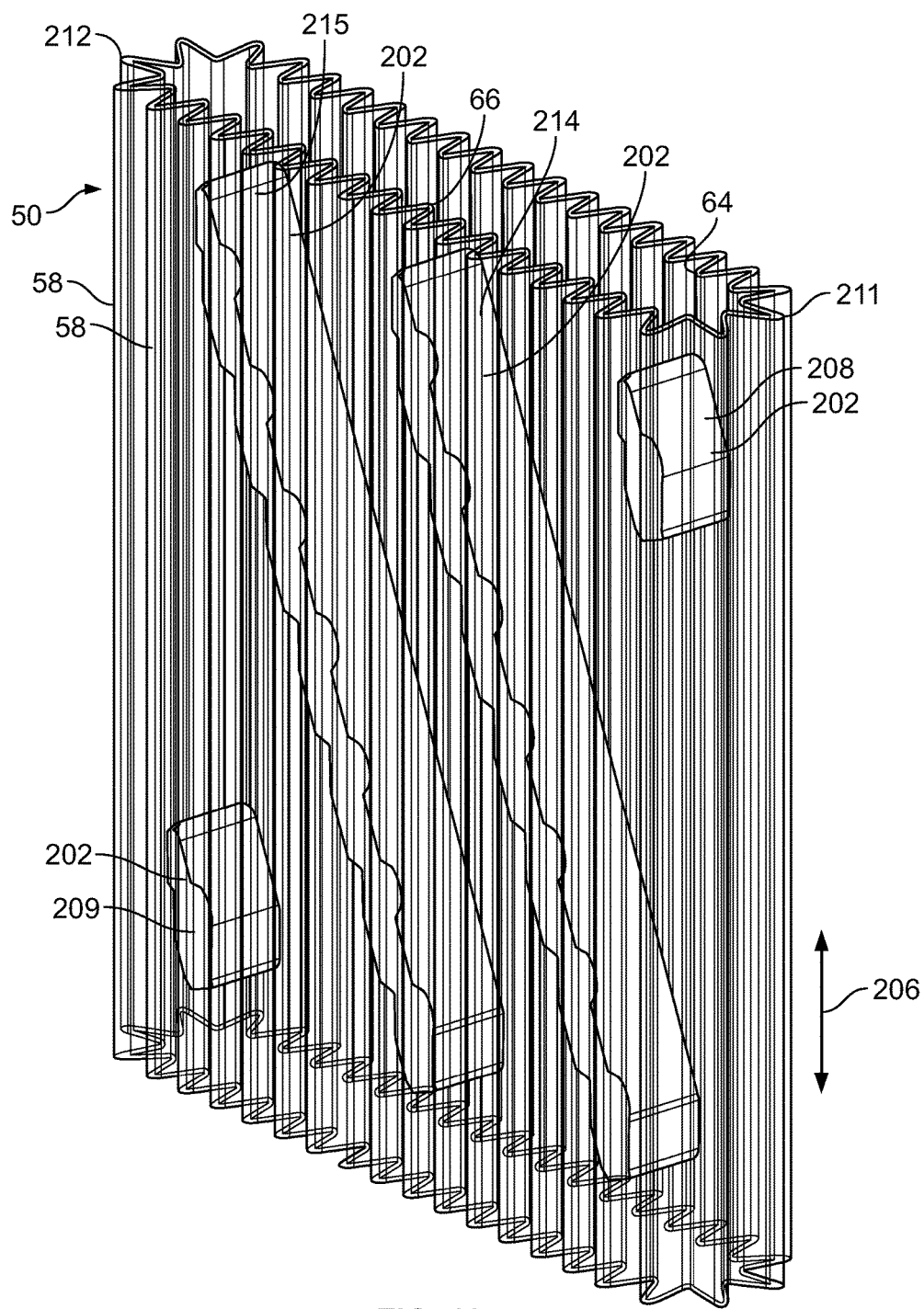
FIG. 13 is a schematic, perspective view of another embodiment of a support structure for a tubular construction of pleated media, constructed in accordance with principles of this disclosure.

FIG. 13 shows an arrow at 206 which is parallel to the direction of pleats 58 of the pleated media 50. The direction of the axis 204 of the spacer 202 is angled at a non-zero angle relative to the direction 206 of the pleats of the pleated media 50.

In one or more embodiments, the angle of the spacer 202 relative to the direction of pleats 58 of the pleated media can be at least 30 degrees and not greater than 170 degrees; or at least 45 degrees; or at least 70 degrees. In one or more embodiments, the angle can be 30-150 degrees; or 100-140 degrees.

Figure 14:
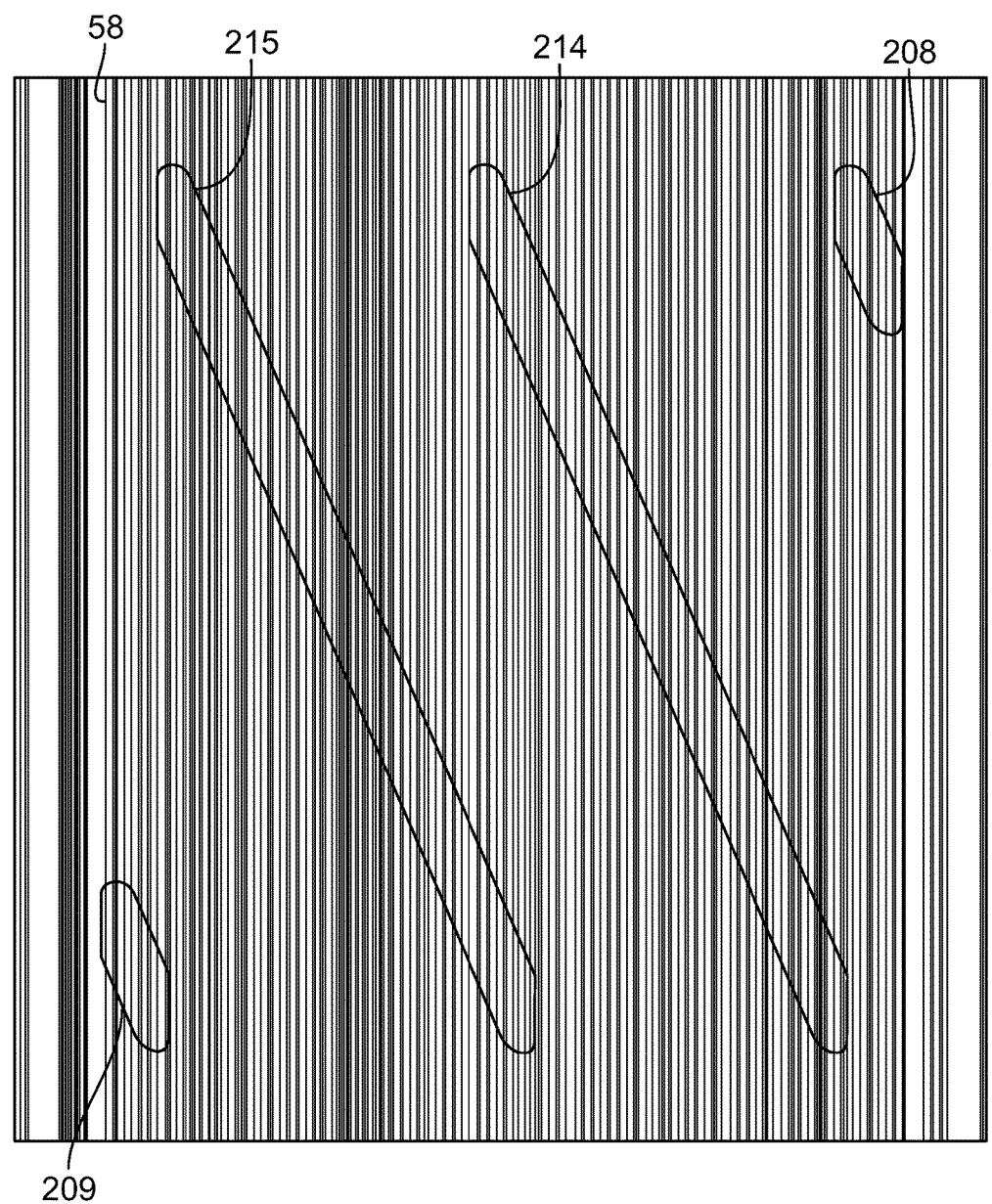
FIG. 14 is a schematic side elevational view of the embodiment of FIG. 13.
Figure 15:
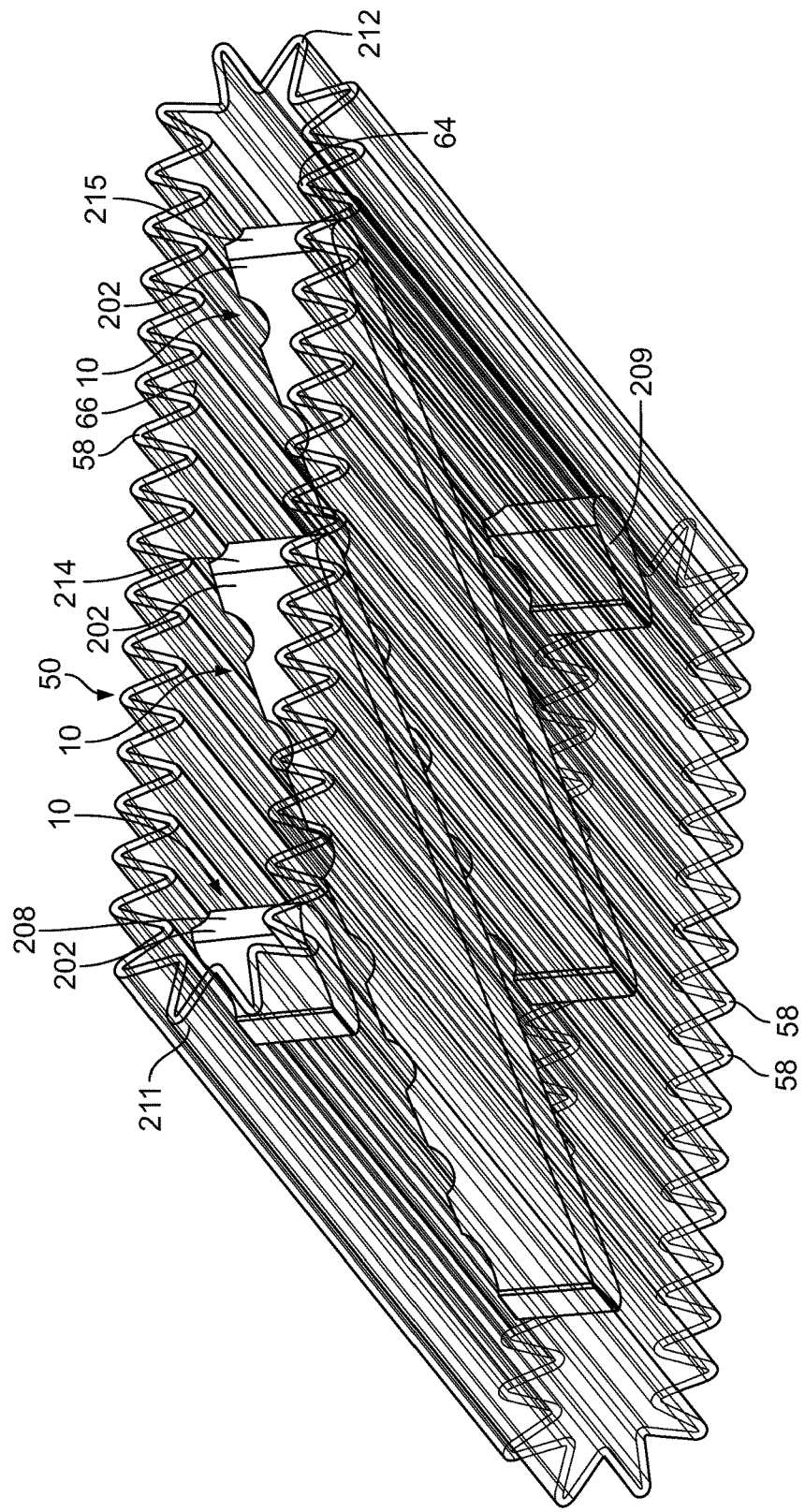
FIG. 15 is a schematic, top perspective view of the embodiment of FIG. 13.
Figure 16:
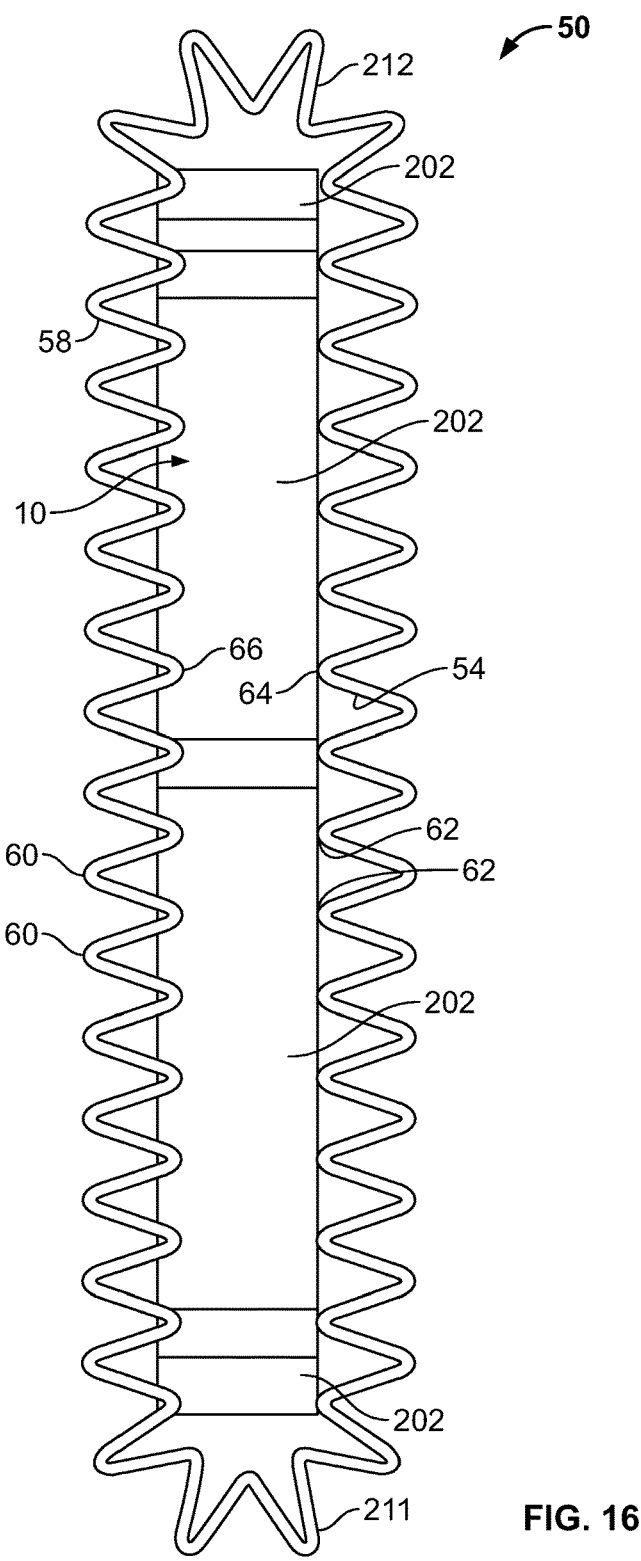
FIG. 16 is a schematic, top plan view of the embodiment of FIG. 13.

In FIGS. 13-15, there are 4 spacers 202 depicted in the interior volume 54 of the pleated media 50. At least two of the spacers 202 have a different length. For example, in FIGS. 13 and 14, two spacers 208, 209 are oriented in the interior volume 54 adjacent to the curved end sections 211, 212 of the tubular construction of pleated media 50. These spacers 208, 209 are shorter in length than spacers 214, 215 oriented between the spacers 208, 209.

FIGS. 17 and 18 depict an example embodiment of one of the spacers 202. The spacer 202 has a first wall 218 and an opposite second wall 220. When oriented in the filter interior volume 54, the first wall 218 will be secured to the interior face 64 of the pleated media 50, while the second wall 220 will be secured to the opposing interior face 66 of the pleated media 50.

The first wall 218 of the spacer 202 is depicted as relatively flat or planar. The second wall 220 is depicted as having a plurality of grooves or scallops 222 therein. The scallops 222 will help to hold the inner pleat tips 62.

Many different sizes can be made. In some example embodiments, the dimension between the first wall 218 and second wall 220 is at least 0.5 inch. In other examples, the dimension between the first wall 218 and second wall 220 is at least 1 inch and not greater than 12 inches. In other embodiments, the dimension between the first wall 218 and second wall 220 is 1-6 inches.

The spacers 202 can be made from many different types of materials. It is advantageous when the material is made from a liquid that cures into a solid because of convenient manufacturing techniques that can be used. For example, the spacers 202 can be made from polyurethane. The polyurethane can be high density polyurethane or a foaming polyurethane. The liquid material could have thixotropic properties as well.

The liquid material to be molded into the spacers 202 could be dispensed in liquid form onto the pleated media 50. Alternatively, the pre-cured liquid material to be molded into the spacers 202 could be dispensed into a mold on which the pleated media 50 would then be placed on top of to form a bond between the media 50 and the curing liquid. When the liquid material cures, it is secured to the media 50 to form the bridge between the opposing interior face 64 and interior face 66.

Figure 19:
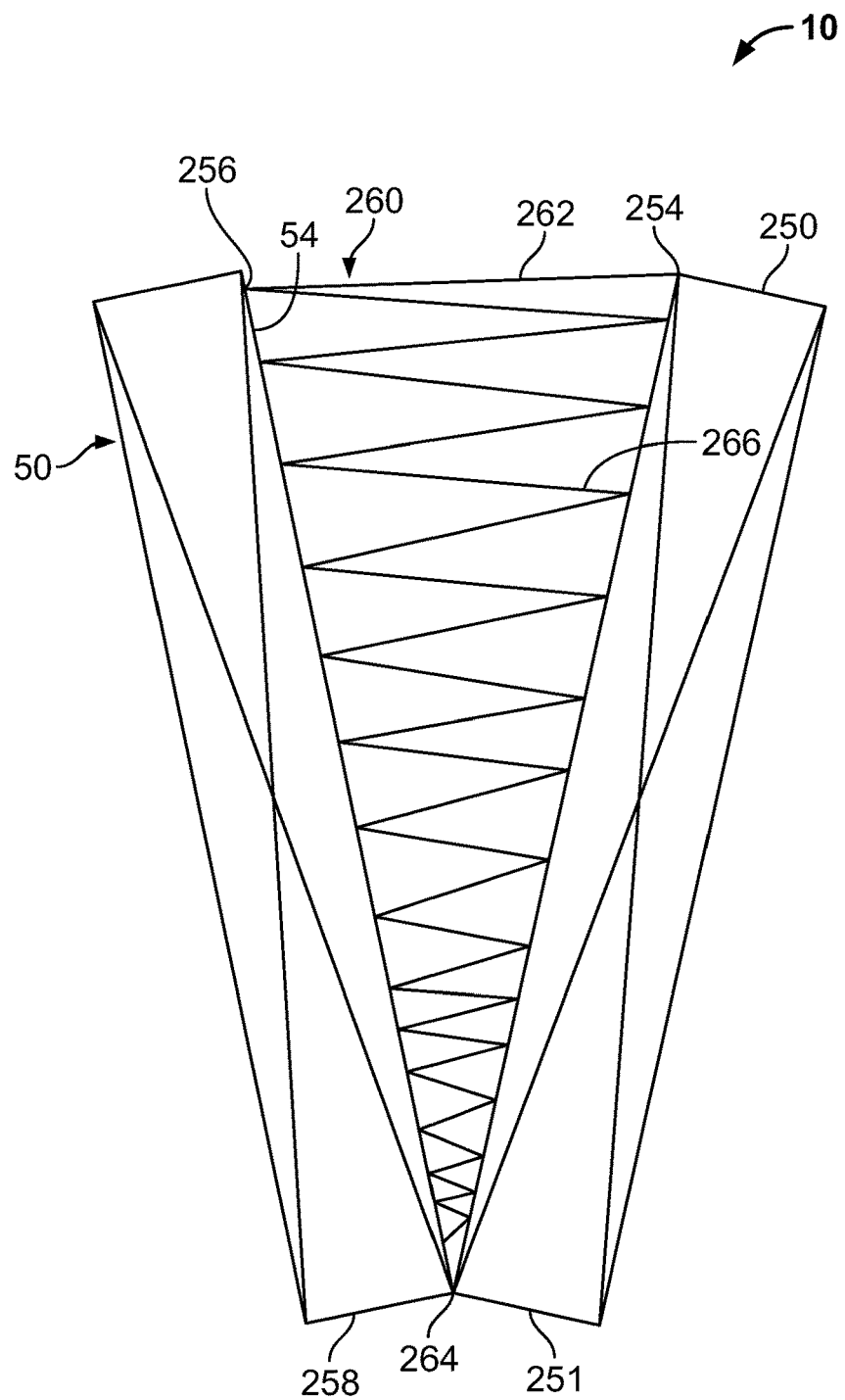
FIG. 19 is a schematic cross-sectional view of another embodiment of a support structure for a tubular construction of pleated media, constructed in accordance with principles of this disclosure.

FIG. 19 is a schematic, cross-sectional view of another embodiment. As with the previous embodiments, there is support structure 10 operably oriented in interior volume 54 of a construction of pleated media 50. In this embodiment, the pleated media 50 is tubular in shape, but has opposite media ends 250, 251 in which one of the media ends 250 is larger than the other media end 251.

In the embodiment of FIG. 19, with the media end 250 being larger or wider than media end 251, there results a larger opening 254 than the opening compared to, for example, the opening of the first end cap 72 shown in FIG. 7. The FIG. 19 construction, of course, can be incorporated into a filter element having end caps of the type shown and described above with respect to FIGS. 5-7, in which the opening 254 will function as a filtration outlet 256.

The opening 256 can have a width that is greater in dimension as compared to the media end 251 that it at least one inch greater and not more than 6 inches greater. In some implementations, the width of the media end 250 as compared to the media end 251 is between 2-4 inches greater.

The media end 251 can be completely closed, and the overall pleated media can be sloped toward itself as it extends from the outlet 256 at media end 250 to a closed end 258 at media end 251.

In some implementations, having the wide end outlet 256 leads to advantages including less restriction and increased flow, as fluid flows from outside of the media 50 into the interior volume 54 and then out through the outlet 256.

The support structure 10 in the FIG. 19 embodiment is similar to the support structure 10 in the embodiment of FIGS. 10-12. That is, in the FIG. 19 embodiment, the support structure 10 comprises a pleated construction 260. Pleated construction 260 is similar to pleated construction 102 with the exception of pleat depth of the pleated construction 60.

The pleated construction 260 has opposite first end 262 and second end 264. The pleats 266 of the pleated construction 260 decrease in pleat depth as the pleated construction 260 extends from the first end 262 to the second end 264.

In FIG. 19, the first end 262 of the pleated construction 260 is even with or immediately adjacent to the outlet 256, while the second end 264 is adjacent to the closed end 258. The pleated construction 260 can extend the pleat length of the interior volume 54 between the outlet 256 and closed end 258. In one or more other embodiments, the pleated construction 260 will extend only partially within the interior volume 54.

The pleated construction 260 can be designed in accordance with the description above with the respect to the embodiment of FIGS. 10-12, which description is incorporated herein by reference.

For all of the above described embodiments of the pleated media 50, it may be beneficial in some cases to put a pleat spacing or immobilization feature onto the pleated media 50. This can be done, for example, with hot melt beads across the pleat tips, such as the outer pleat tips 60 or the inner pleat tips 62.

In operation, fluid, such as air or liquid, to be filtered will flow through the pleated media 50 and into the interior volume 54. The fluid will be able to pass through the support structure because of the porosity through the support structure 10. The filtered fluid will then be conveyed out of the filter element 70 through the opening in the first end cap 72.

While filtering the fluid, the filter media 50 is supported to prevent the filter media 50 from collapsing together. This is done by using the support structure 10 in the interior volume 54.

The above specification provides examples of principles of this disclosure. Many embodiments can be made.

What is claimed is:

1. A filter element comprising:
   (a) a tubular construction of pleated filter media defining an interior volume;
   (b) first and second opposite end caps secured to opposite ends of the filter media; and
   (c) a semi-rigid pleated screen supporting the pleated filter media and operably oriented in the interior volume, wherein the semi-rigid pleated screen is oriented between and against opposing faces of the pleated filter media,
      wherein the semi-rigid pleated screen has pleats extending in a direction non-parallel and angled relative to a direction of pleats of the pleated filter media; and
      wherein the filter element is free of an inner liner.

2. The filter element according to claim 1 wherein the pleats of the semi-rigid pleated screen extends at an angle 80-100 degrees relative to the direction of pleats of the pleated filter media.

3. The filter element according to claim 1 wherein the semi-rigid pleated screen is non-metal.

4. The filter element according to claim 1 wherein the semi-rigid pleated screen extends a complete length between the first and second end caps.

5. The filter element according to claim 1 wherein the semi-rigid pleated screen extends less than a complete length between the first and second end caps.

6. The filter element according to claim 1 wherein the first end cap is an open end cap in communication with the interior volume.

7. The filter element according to claim 1 wherein the second end cap is a closed end cap.

8. The filter element according to claim 1 wherein the pleated filter media is non-round.

9. The filter element according to claim 1 wherein the pleated filter media is oval.

10. A method of filtering comprising:
    (a) providing a filter element according to claim 1;
    (b) directing fluid to flow through the pleated filter media and into the interior volume; and
    (c) while the fluid is flowing through the pleated filter media, supporting the filter media to prevent the filter media from collapsing together by using the semi-rigid pleated screen.

11. The filter element of claim 1 wherein the semi-rigid pleated screen has opposite first and second ends, and the pleats of the semi-rigid pleated screen decrease in pleat depth as the semi-rigid pleated screen extends from the first end to the second end.

12. The filter element of claim 11 wherein the construction of pleated filter media defining the interior volume has opposite media ends, with one media end being larger than the other media end.

13. The filter element of claim 1 wherein the semi-rigid pleated screen is secured to at least the second end cap.

14. The filter element of claim 1 wherein the semi-rigid pleated screen is secured to at least the pleated media.

15. The filter element of claim 1 wherein the semi-rigid pleated screen is secured to each of the first end cap and second end cap.

16. A filter element comprising:
(a) a tubular construction of pleated filter media defining an interior volume;
(b) first and second opposite end caps secured to opposite ends of the filter media; and
(c) a semi-rigid pleated screen supporting the pleated filter media and operably oriented in the interior volume, wherein the semi-rigid pleated screen is oriented between and against opposing faces of the pleated filter media,
wherein the semi-rigid pleated screen has pleats extending in a direction non-parallel and angled relative to a direction of pleats of the pleated filter media; and
wherein the semi-rigid pleated screen extends less than a complete length between the first and second end caps.

17. The filter element according to claim 16 wherein the pleats of the semi-rigid pleated screen extends at an angle 80-100 degrees relative to the direction of pleats of the pleated filter media.

18. The filter element according to claim 16 wherein the pleated filter media is non-round.

19. A filter element comprising:
(a) a tubular construction of pleated filter media defining an interior volume;
(b) first and second opposite end caps secured to opposite ends of the filter media; and
(c) a semi-rigid pleated screen supporting the pleated filter media and operably oriented in the interior volume, wherein the semi-rigid pleated screen is oriented between and against opposing faces of the pleated filter media,
wherein the semi-rigid pleated screen has pleats extending in a direction non-parallel and angled relative to a direction of pleats of the pleated filter media; and
wherein the semi-rigid pleated screen has opposite first and second ends, and the pleats of the semi-rigid pleated screen decrease in pleat depth as the semi-rigid pleated screen extends from the first end to the second end.

20. The filter element according to claim 19 wherein the pleated filter media is non-round.

* * * * *